(12) United States Patent
Buecherl et al.

(10) Patent No.: US 11,416,241 B2
(45) Date of Patent: Aug. 16, 2022

(54) METHOD AND DEVICE FOR PROCESSING A SOFTWARE UPDATE

(71) Applicant: Bayerische Motoren Werke Aktiengesellschaft, Munich (DE)

(72) Inventors: Gunther Buecherl, Olching (DE); Johann Kratzer, Munich (DE); Robert Sandner, Bruckmuehl (DE); Michael Spiegler, Grosskarolinenfeld (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 93 days.

(21) Appl. No.: 16/782,789

(22) Filed: Feb. 5, 2020

(65) Prior Publication Data

US 2020/0174782 A1    Jun. 4, 2020

Related U.S. Application Data

(63) Continuation of application No. PCT/EP2018/074274, filed on Sep. 10, 2018.

(30) Foreign Application Priority Data

Oct. 6, 2017 (DE) .................. 10 2017 217 807.8

(51) Int. Cl.
*G06F 8/60* (2018.01)
*G06F 8/654* (2018.01)
*H04W 4/40* (2018.01)
*G06F 21/44* (2013.01)

(52) U.S. Cl.
CPC .............. *G06F 8/654* (2018.02); *G06F 21/44* (2013.01); *H04W 4/40* (2018.02)

(58) Field of Classification Search
CPC .................................... G06F 9/44; G06F 8/60
See application file for complete search history.

(56) References Cited

U.S. PATENT DOCUMENTS

| | | | | |
|---|---|---|---|---|
| 6,122,646 A | * | 9/2000 | Igarashi | G11B 27/11 |
| 10,880,361 B2 | * | 12/2020 | Boehm | H04L 67/12 |
| 2003/0062228 A1 | * | 4/2003 | Ichinose | B60T 13/741 |
| | | | | 188/72.3 |

(Continued)

FOREIGN PATENT DOCUMENTS

| DE | 10 2015 203 151 A1 | 8/2015 |
|---|---|---|
| DE | 20 2016105 327 U1 | 2/2017 |
| EP | 1 108 984 A1 | 6/2001 |

OTHER PUBLICATIONS

International Search Report (PCT/ISA/210) issued in PCT Application No. PCT/EP2018/074274 dated Dec. 19, 2018 with English translation (four (4) pages).

(Continued)

*Primary Examiner* — Jae U Jeon
(74) *Attorney, Agent, or Firm* — Crowell & Moring LLP

(57) ABSTRACT

A method and a device for processing a software update for at least one vehicle device, in particular for a head unit in the vehicle. The software update is stored by a control device in a second memory area which is different from a first memory area that has a software currently used by the vehicle device. The control device controls the access of the vehicle device to a single data memory, the data memory including at least the first and second memory areas.

19 Claims, 3 Drawing Sheets

(56) References Cited

U.S. PATENT DOCUMENTS

| | | | | |
|---|---|---|---|---|
| 2008/0027602 | A1* | 1/2008 | Yeap | B60R 25/04 |
| | | | | 701/31.4 |
| 2009/0306890 | A1* | 12/2009 | Yoshida | G09B 29/106 |
| | | | | 701/423 |
| 2010/0293303 | A1* | 11/2010 | Choi | H04W 76/14 |
| | | | | 710/16 |
| 2011/0202737 | A1* | 8/2011 | Takahashi | G06F 11/201 |
| | | | | 711/E12.103 |
| 2014/0068590 | A1 | 3/2014 | Natsume | |
| 2015/0242198 | A1 | 8/2015 | Tobolski et al. | |
| 2016/0098266 | A1* | 4/2016 | Martin | G06F 8/654 |
| | | | | 717/171 |
| 2017/0212837 | A1* | 7/2017 | Breternitz | G06F 3/0611 |
| 2018/0196656 | A1* | 7/2018 | Miller | H04L 67/34 |
| 2019/0366811 | A1* | 12/2019 | O'Keeffe | B60W 40/12 |

OTHER PUBLICATIONS

German-language Written Opinion (PCT/ISA/237) issued in PCT Application No. PCT/EP2018/074274 dated Dec. 19, 2018 (five (5) pages).

German-language Search Report issued in counterpart German Application No. 10 2017 217 807.8 dated Oct. 4, 2018 with partial English translation (13 pages).

* cited by examiner

METHOD AND DEVICE FOR PROCESSING A SOFTWARE UPDATE

CROSS REFERENCE TO RELATED APPLICATIONS

This application is a continuation of PCT International Application No. PCT/EP2018/074274, filed Sep. 10, 2018, which claims priority under 35 U.S.C. § 119 from German Patent Application No. 10 2017 217 807.8, filed Oct. 6, 2017, the entire disclosures of which are herein expressly incorporated by reference.

BACKGROUND AND SUMMARY OF THE INVENTION

The invention relates to a method and a device for processing a software update for at least one vehicle device, in particular for a head unit in the vehicle.

By making use of wireless radio technologies it is becoming more and more common to use the facility to send software updates via, for example, a mobile radio connection to a vehicle as so-called "Over The Air" (OTA) software updates, so that the latter can use the received software update. It has proved to be a disadvantage, however, that a smooth operation of the vehicle cannot be guaranteed during the updating of the received software, so that, in particular, for security reasons, the software update is often carried out while the vehicle is stopped.

From the prior art it is known to process such software updates in a vehicle while it is being driven. The publication DE 20 2016 105 327 U1 relates, for example, to an electronic control unit for a road vehicle which has two memory banks, the first memory bank containing a current version of a control software. A second memory bank, which is completely identical to the first memory bank, is used to store an update of the control software on it.

An object of the invention is to create an improved method for processing a software update. A further object of the invention is to provide a corresponding improved device for processing a software update. Also, a further object of the invention is to provide an improved vehicle having such a device for processing a software update.

These objects are achieved by a method for processing a software update, a device for processing a software update, and a vehicle equipped with such a device for processing a software update claimed herein.

A first aspect of the invention relates to a method for processing at least one software update for at least one vehicle device, in particular for a head unit in the vehicle, the method having the following process steps:

storing the software update in a second memory area which is different from a first memory area, which has a software currently being used by the vehicle device, by means of a control device which controls the access by the vehicle device to a single data memory, wherein the data memory comprises at least the first and the second memory area; and changing the access by the vehicle device to a software, which is updated using the software update, from the first memory area to the second memory area by means of the control device.

The method according to the invention allows vehicle devices with only a single data memory to be updated for the operation of the vehicle device. The method according to the invention preferably allows the processing of the software update while driving, so that the operation of the vehicle does not need to be interrupted. In addition, the software update process in a vehicle is relatively energy intensive, so that during the update a large amount of power is consumed, in particular due to the memory operations. By means of the method according to the invention the software update, in particular at least the memory operation, can now be executed during a journey in which electrical energy is preferably generated by the drive unit, without, for example, discharging a car battery in a stationary state.

More preferably, due to the implementation of only one data memory this method according to the invention is cost-effective, since by applying this method existing vehicle devices do not need an additional physically separate second data memory for the update. Furthermore, future vehicles will not need to have vehicle devices with two data memories or more, since, to carry out the method of the invention, the vehicle device only needs to have a single data memory. Thus, this method allows, on a single data memory of a vehicle device, software to be updated with a purely logically but not physically separated memory areas, wherein the operational functionality observable by a user of the vehicle is not impacted during potentially long-lasting transmission and/or copying operations.

A software update within the meaning of the invention is at least one storable file segment, which has enhancements and/or optimizations of a given current software version. Preferably a software update is a straightforward update of the software. In addition, a software update can also be a software upgrade, which preferably comprises a higher-quality configuration or version of a software version. The term software update may also be understood to include an update with additional new file segments and/or files.

A vehicle device within the meaning of the invention is a device which is designed to carry out a particular function during the operation of a vehicle, which is controlled by means of predefined instructions. In particular, the vehicle device can be a driver assistance system, a drive system, an infotainment system, a suspension system or else a component of these systems.

A head unit within the meaning of the invention is an infotainment device which is preferably positioned within the vehicle. A head unit preferably combines a car radio, a navigation system, a hands-free device or even driver assistance systems and other functions in a central control unit.

A control device within the meaning of the invention is a device which at least partially controls the operation of a vehicle device, in particular by means of a processor, in particular a CPU. In particular, the control device is a component of the vehicle device and is configured to manage the updating of the software of the vehicle device.

A data memory within the meaning of the invention is a storage medium on which data can be stored in digitized form. This is in particular read-only memory, which as non-volatile memories are rewritable is designed for permanent storage of data. The data memory has, in particular, only a single storage medium, preferably a single hard drive or a single flash memory.

A memory address within the meaning of the invention is a memory cell of a data memory which is used to uniquely reference a memory access, in order to designate the exact memory location which is accessed, in particular by the control device and/or the vehicle device.

A memory area within the meaning of the invention comprises at least two memory addresses, which are preferably arranged directly adjacent. A memory area preferably contains a multiplicity of memory addresses, which more preferably relate to an entire file. In particular, a memory area can also relate to two logically separate memory addresses and/or address ranges, which are not arranged directly adjacent.

An access by a vehicle device within the meaning of the invention can be understood to mean reading and/or writing of a memory address, in particular of a memory area, preferably in order to process and/or execute a piece of software which is stored in the memory address and/or the memory area.

Copying within the meaning of the invention can be understood to mean that the content of a memory address, in particular of a memory area, is mirrored from at least one first memory address into a second memory address, so that the first and second memory addresses contain the same content. Preferably, copying can also be understood to mean moving or cutting and pasting the contents of a first memory address into a second memory address, so that the second memory address has the content which was originally present in the first memory address, and the first memory address has either no, or an undefined content.

Decryption within the meaning of the invention can be understood to mean decoding data. This process can preferably involve using a predetermined algorithm and/or procedure to convert an encrypted input data string into plain text, allowing the input data string to be processed.

Authentication within the meaning of the invention can be understood to mean that an input data string is checked by means of a predetermined procedure, to determine whether the input data sequence actually has the properties, in particular origin and/or publisher, which it indicates. This means that a verification of the authenticity of an input data string can be guaranteed in order preferably to detect falsified and/or incorrect input data.

An operating state within the meaning of the invention is a predetermined state of a vehicle at a predetermined time. In particular, it may be an operating state in which the vehicle is stationary with the engine switched off and/or stationary with the engine running and/or while being driven.

A partitioning within the meaning of the invention is dividing a data memory into at least one predefined memory area, wherein the latter comprises a plurality of adjacent memory addresses.

A communication device within the meaning of the invention preferably has at least one antenna which is designed to send and/or receive electromagnetic signals. In particular, the communication device enables a wireless transmission and/or reception of, for example, software updates or system states. A mobile radio connection is preferably used to transfer data. More preferably, a wired connection to a PC device can also be set up by means of the communication device.

A backend server within the meaning of the invention is a PC device and/or a system assembly which is configured for sending data to at least one receiver. The backend server preferably communicates with the control device of the vehicle via the communication device and sends a software update to the control device. The backend server preferably sends the software update to a multiplicity of vehicles, which in particular originate from the same production series.

In a preferred embodiment, the method has at least the following additional step:
copying software which is not updated from the first memory area into the second memory area by means of the control device.

It is thereby possible to ensure that unmodified data, which are located in the first memory area of the data memory of the vehicle device, can be transferred to the second memory area of the data memory using a simple copying procedure. This can deliver time savings, in particular. More preferably, this allows additional downloading of software updates to be avoided, so that in particular transmission times and any transmission costs can be saved.

In a further preferred arrangement, the method has at least one of the following additional steps:
decrypting the software update by means of the control device; and
authenticating the software update by means of the control device.

The decryption of the software update can ensure that data can be received and processed in encrypted form via a connection to a backend server which distributes the software update. Preferably, using the authentication the correctness and/or authenticity of the software update can be examined in order to keep malicious software such as computer viruses away from the vehicle.

In a further preferred embodiment, the method has the following additional step:
checking the storage capacity of the at least second memory area by means of the control device.

This means that any storage space problem in the data memory can preferably be detected in advance, so that the software update is downloaded only if sufficient storage capacity for the software update is available in the second memory area.

In a further preferred embodiment, the method is carried out during at least one predetermined operating state of the control device and/or the vehicle device. Thus, it can preferably be ensured that a software update is applied only in predetermined operating states of the control device and/or the vehicle device. Preferably, a software update, in particular the storage process, is also possible while driving and thus during the operation of the vehicle, so that no delays to the operation of the vehicle occur.

In a further preferred embodiment, the method has the following additional steps:
comparing the operating state of the control device and/or of the vehicle device with the predetermined operating state; and
pausing the storage operation of the data memory of the vehicle device if the current operating state of the control device and/or of the vehicle device does not correspond to the predetermined operating state.

Preferably, by comparing the operating state of the control device and/or the vehicle device it is possible to ensure that the software update is performed only when the control device and/or the vehicle device is/are in a predetermined operating state. If the operating state of the control device and/or the vehicle device should change during the software update, then the updating process can be paused in order to avoid any disruption during the operating period of the vehicle.

A second aspect of the invention relates to a device for processing at least one software update in a vehicle, in particular in a motor vehicle, having:
a vehicle device, in particular a head unit, with a single data memory, which has at least one first and one second memory area, and the first memory area has a software currently being used to control the vehicle device; and
a control device, which controls the access by the vehicle device to the data memory; wherein the control device is configured in such a way that the software update can be stored in the second memory area and the access by the vehicle device to the software can be changed from the first memory area to the second memory area, which has a software updated using the software update to control the vehicle device.

In a preferred embodiment the memory sizes of the pre-defined memory areas are at least substantially the same. It can thus be ensured that the second memory area has sufficient storage capacity to allow the software update to be stored in the second memory area.

In a further preferred embodiment the memory areas are implemented as partitions. This preferably allows the data memory, in particular the first and/or second memory area, to have a contiguous section of a plurality of memory addresses, so that a logical separation can be made between the first and the second memory area. A logical separation into two memory areas in a single data memory is to be preferred over a physical separation into two different data memories, because the dynamic design of the memory area within a data memory provides an increased flexibility.

In a further preferred embodiment, the software update comprises at least one updated file. It can therefore be ensured that the software update is carried out by means of at least one updated file, so that only files instead of file segments are preferably updated.

In a further preferred embodiment the data memory is implemented as a non-volatile memory, preferably as a flash memory or a hard disk memory. It can thus be ensured that the data which are located on the data memory, in particular the updated software, will not be lost by shutting off the power supply to the data memory.

In a further preferred embodiment the first and/or the second memory area are each distributed in a predetermined address range, or each in two predetermined address ranges. It can thus be ensured that, independently of free and/or available memory addresses which are at adjacent locations, the software update can still be stored. Preferably, the software update can also be stored on a highly fragmented second memory area, which only allows a dispersed storage of logically related data blocks of the software update.

In a further preferred embodiment, the device has a communication device by means of which the software update can be wirelessly received. It can thus be ensured that a software update can also be received during a journey, so that the unrestricted operation of the vehicle is guaranteed. It is thus also preferably possible to avoid the need for the vehicle to visit a workshop during which the software update is installed on the vehicle via a wired connection, thus resulting in time and cost savings.

A third aspect of the invention relates to a vehicle having at least one device for processing a software update according to the second aspect.

The features and advantages described below in relation to the first aspect of the invention and its advantageous design also apply to the second and third aspect of the invention and its advantageous embodiment, and vice versa.

Further features, advantages and application possibilities of the invention are derived from the following description in connection with the figures, in which the same reference numerals are used consistently for identical or corresponding elements of the invention. Shown are, at least partially schematically:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
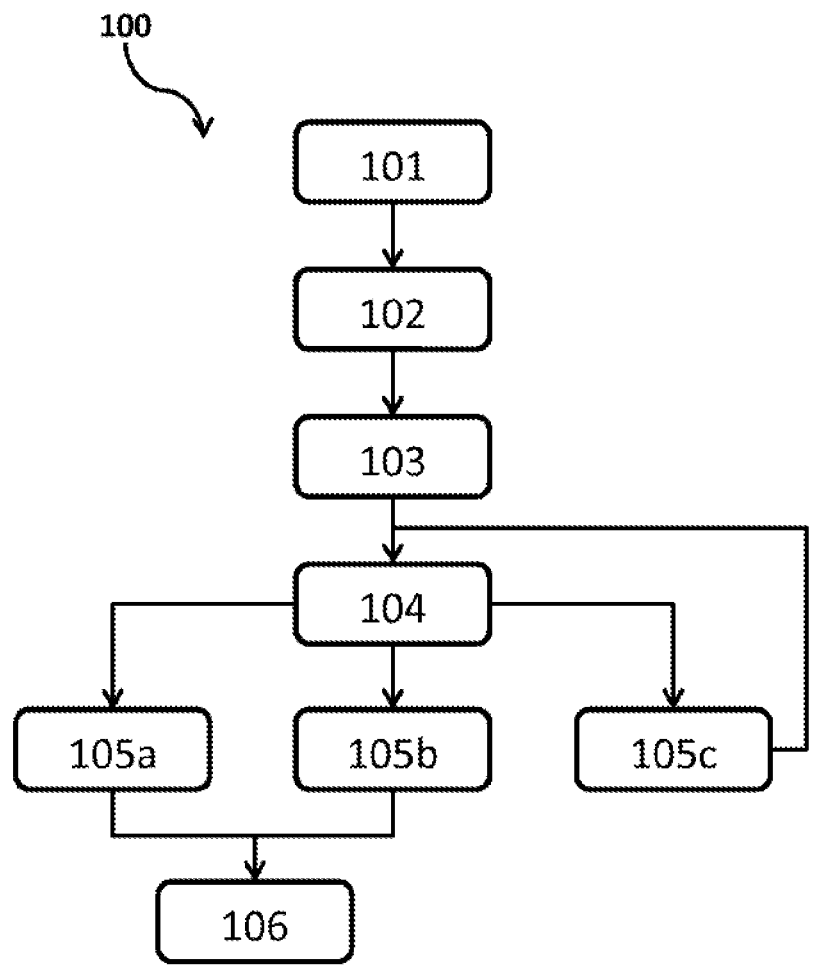
FIG. 1 an exemplary embodiment of a method according to the invention for processing at least one software update for at least one vehicle device.

FIG. 1 shows an exemplary embodiment of a method 100 according to the invention for processing at least one software update for at least one vehicle device 2.

In a first process step 101, the software update is decrypted using the control device 3. This allows the transmission of the software update, which originates from a backend server 5, via an encrypted communication, so that third parties have no direct access to the data of the software update.

In a second process step 102, the software update is authenticated using the control device 3. It can therefore be ensured that the software update is checked for its correctness and origin. This means that processing of malicious software can be prevented. Preferably, this step is also carried out once again before changing the access by the vehicle device 2 to a software, which is updated by means of the software update, from the first memory area 7 to the second memory area 8 by means of the control device 3.

In a third process step 103, the storage capacity of the at least second memory area 8 is checked by means of the control device 3. It can thus be ensured that enough storage space is available in the second memory area 8 for the software update, and that the cancellation of the software update due to lack of space can be prevented.

In a fourth process step 104 the operating state of the control device 3 and/or of the vehicle device 2 is compared with a predetermined operating state. This is intended to ensure that the software update is executed only if no impairment to the driving operation of the vehicle 1 can be guaranteed. It is preferable to ensure that safety-critical systems, such as those relating to the driver assistance, can still be operated without any restrictions due to the software update. More preferably, the method 100 is carried out during at least one predetermined operating state of the control device 3 and/or the vehicle device 2.

In one process step 105a, software which is not updated is copied from the first memory area 7 into the second memory area 8 by means of the control device 3. This preferably allows a simple and rapid transfer of data from the first memory area 7 into the second memory area 8. More preferably, data that are not required for the software update therefore do not need to be transferred, which leads to the reduction of data traffic. This process step should preferably only be regarded as an optional step.

In a process step 105b the software update is stored in the second memory area 8, which is different from the first memory area 7 which has a software currently being used by the vehicle device 2, by means of the control device 3, which controls access by the vehicle device 2 to the single data memory 6, wherein the data memory 6 comprises at least the first and the second memory area 7, 8.

In a process step 105c the storage operation of the data memory 6 of the vehicle device 2 is paused if the current operating state of the control device 3 and/or of the vehicle device 2 does not correspond to the predetermined operating state. It can thereby be preferably ensured that the operation of the vehicle 1 and, in particular, safety-critical process steps of the vehicle 1, can be executed unrestricted. After performing this step, in particular after a predetermined time interval or after an interrupt which identifies the change in the operating state of the control device 3 and/or the vehicle device 2, the process step 104, namely the comparison of the operating states, is preferably executed again.

In a further process step 106 the access by the vehicle device 2 to a software, which is updated by means of the software update, is changed by means of the control device 3 from a predetermined memory address 13 of the first memory area 7, in particular from a predetermined memory address 13 of the first memory area 7, to the second memory area 8, in particular a predetermined memory address 14 of the second memory area 8. In particular, this step ensures that the software update can be used immediately after the download and it is only necessary to stop the vehicle for a short period of time. More preferably, if an error is detected within the software update it is also possible to restore the older version of the software, which is located in the first memory area 7 of the data memory 6. This preferably allows a redundant storage of at least essentially basic functions which relate to the vehicle device 2.

Figure 2:
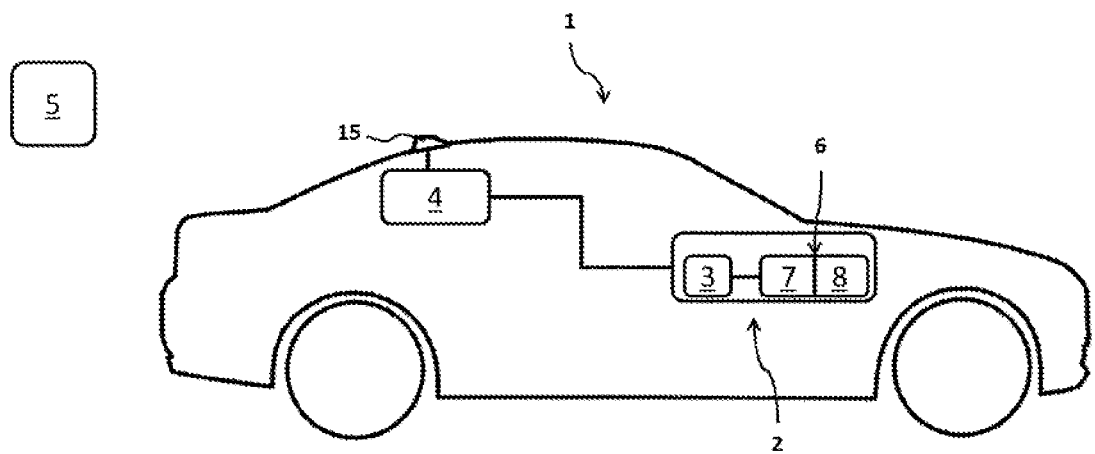
FIG. 2 an exemplary embodiment of a vehicle according to the invention having at least one device for processing at least one software update.

FIG. 2 shows an exemplary embodiment of a vehicle according to the invention 1 having at least one device for processing at least one software update. The vehicle 1 has the vehicle device 2, which has the control device 3, wherein the control device 3 controls the access by the vehicle device 2 to the data memory 6. In addition, the vehicle device 2 is connected to a communication device 4, which has an antenna 15. The vehicle device 2 comprises the data memory 6, which in turn is sub-divided into at least 2 memory areas 7, 8. The first memory area 7 in this case has a software which is currently used to control the vehicle device 2.

The control device 3 is configured in such a way that the software update can be stored in the second memory area 8 and the access of the vehicle device 2 to the software can be changed from the first memory area 7 to the second memory area 8, which has a software updated by means of the software update for controlling the vehicle device 2.

Via a wireless communication interface, in particular a mobile radio link, data originating from a backend server 5 can be received by means of the antenna 15, which is located on the roof of the vehicle 1. The vehicle device 2 can preferably be a head unit, which is arranged within the vehicle 1.

In a preferred embodiment the control device 3 has a Linux kernel. The use of a Linux-based control device 3 is advantageous since operating systems based on Linux are based on an open platform and the operating systems can be used at least substantially free of charge independently of commercially-oriented companies.

Figure 3:
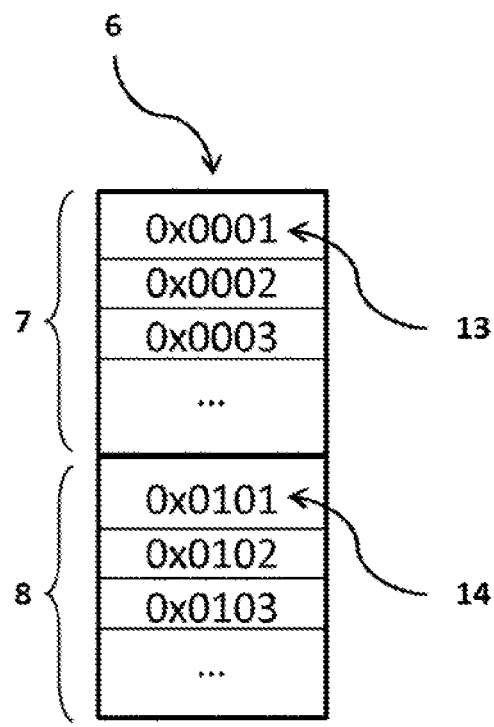
FIG. 3 an exemplary embodiment of a data memory according to the invention of a vehicle device.

FIG. 3 shows an exemplary embodiment of a data memory 6 according to the invention of a vehicle device 2. The data memory 6 has two memory areas 7, 8, namely the first memory area 7 and the second memory area 8. The data memory 6 also has memory addresses 13, 14, which are shown in FIG. 3 as hexadecimal numbers. The memory sizes of the pre-defined memory areas 7, 8 are preferably at least substantially the same. Therefore, a simple exchange of the data from the first memory area 7 to the second memory area 8 can be ensured, since these have at least essentially equal-sized memory capacities.

The second memory area 8 in this case has at least three memory addresses, which preferably represent at least one updated file. Preferably, the software update has a plurality of files, in particular only files, which are updated. This allows a simple handling of the software update, since only files and not file segments are stored.

The data memory 6 is preferably implemented as a non-volatile memory, preferably as a flash memory or a hard disk memory. In particular, the use of a flash memory is to be preferred in a vehicle 1, as a flash memory is at least substantially robust against vibrations which that during the operation of the vehicle 1. Preferably, the data memory 6 can also be implemented as hard disk storage, which have a better cost-storage ratio.

In a preferred embodiment the data memory 6 is implemented in at least two partitions, a first partition being the first memory area 7 and a second partition being the second memory area 8. This allows, in particular, a simple logical association of the two memory areas 7, 8, so that the control device 3 can control a more efficient access to the data memory 6 by the vehicle device 2.

Figure 4:
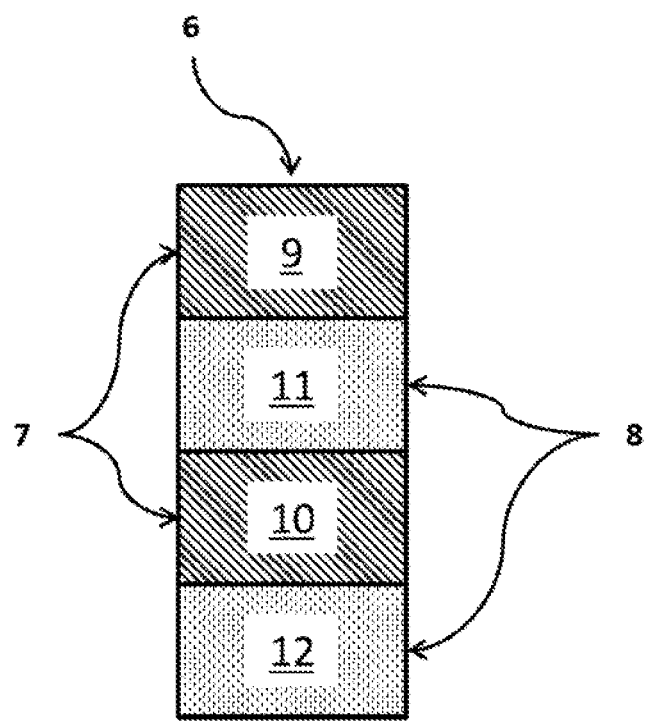
FIG. 4 another exemplary embodiment of a data memory according to the invention of a vehicle device.

FIG. 4 shows a further exemplary embodiment of a data memory 6 according to the invention of a vehicle device 2. The data memory 6 has two memory areas 7, 8, wherein the first memory area 7 is divided into two address ranges 9, 10, and the second memory area 8 is divided into two address ranges 11, 12. In particular, the first address range 9 is physically separated from the second address range 10, wherein a third address range 11 of the second memory area 8 is arranged between the first address range 9 and the second address range 10 of the first memory area 7. Thus, a memory area does not necessarily need to be limited to a predetermined address range, but can also be distributed over two different address ranges 10, 11 which are arranged physically separately from one another. This is particularly important for file-based software updates, since the files can be stored in a distributed manner over different address ranges. In addition, the use of a fragmented data memory is also possible in this case.

LIST OF REFERENCE NUMERALS 1 vehicle
2 vehicle device
3 control device
4 communication device
5 backend server
6 data memory
7 first memory area
8 second memory area
9 first address range
10 second address range
11 third address range
12 fourth address range
13 memory address of the first memory area
14 memory address of the second memory area
15 antenna
100 method for processing at least one software update The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing at least one software update for at least one vehicle device including a head unit in a vehicle, the method comprising:
   storing the software update in a second memory area which is different from a first memory area, which has a software currently being used by the vehicle device, by a control device which controls access by the vehicle device to a single data memory including at least the first memory area and the second memory area; and
   changing the access to an updated software in the single data memory from the first memory area to the second memory area, such that the vehicle device has access to the updated software; and
   copying, by the control device from the first memory area into the second memory area, portions of the software stored in the first memory area which are not updated by the software update.

2. The method according to claim 1, further comprising at least one of:
   decrypting the software update by the control device; and
   authenticating the software update by the control device.

3. The method according to claim 1, further comprising:
   checking a storage capacity of the second memory area by the control device.

4. The method according to claim 1, wherein the method is carried out during at least one predetermined operating state of the control device and/or the vehicle device.

5. The method according to claim 4, further comprising:
   comparing the operating state of the control device and/or of the vehicle device with the predetermined operating state; and
   pausing the storage operation of the data memory of the vehicle device if the current operating state of the control device and/or of the vehicle device does not correspond to the predetermined operating state.

6. The method according to claim 5, further comprising at least one of:
   decrypting the software update by the control device; and
   authenticating the software update by the control device.

7. The method according to claim 5, further comprising:
   checking a storage capacity of the second memory area by the control device.

8. An apparatus for processing at least one software update in a motor vehicle, comprising:
   a vehicle device, including a head unit, having a single data memory which has a first memory area and a second memory area, and the first memory area has a software currently being used to control the vehicle device; and
   a control device, which controls access by the vehicle device to the single data memory;
   wherein the control device is configured to change the access to an updated software in the single data memory from the first memory area to the second memory area, such that the vehicle device has access to the updated software, and portions of the software stored in the first memory which are not updated by the software update are copied from the first memory area into the second memory area by the control device.

9. The apparatus according to claim 8, wherein memory sizes of the first and second memory areas are substantially equal.

10. The apparatus according to claim 9, wherein the first and second memory areas are implemented as partitions.

11. The apparatus according to claim 9, wherein the software update comprises at least one updated file.

12. The apparatus according to claim 9, wherein the data memory is implemented as a non-volatile memory, including a flash memory or a hard disk memory.

13. The apparatus according to claim 8, wherein the first and second memory areas are implemented as partitions.

14. The apparatus according to claim 8, wherein the software update comprises at least one updated file.

15. The apparatus according to claim 8, wherein the data memory is implemented as a non-volatile memory, including a flash memory or a hard disk memory.

16. The apparatus according to claim 8, wherein the control device has a Linux kernel.

17. The apparatus according to claim 8, wherein at least one of the first and second memory areas is distributed in a predetermined address range or in two predetermined address ranges.

18. The apparatus according to claim 8, further comprising a communication device configured to receive the software update wirelessly.

19. A motor vehicle having an apparatus according to claim 8.

* * * * *